(12) United States Patent
Junklewitz (10) Patent No.: US 7,053,903 B1
(45) Date of Patent: May 30, 2006

(54) METHODS AND APPARATUS FOR WRITE WATCH FOR VERTEX LISTS

(75) Inventor: Alfred Junklewitz, Aachen (DE)

(73) Assignee: NVIDIA Corporation, Santa Clara, CA (US)

( * ) Notice: Subject to any disclaimer, the term of this patent is extended or adjusted under 35 U.S.C. 154(b) by 54 days.

(21) Appl. No.: 10/654,831

(22) Filed: Sep. 3, 2003

(51) Int. Cl.
*G09G 5/39* (2006.01)
*G06F 13/00* (2006.01)
*G06T 1/60* (2006.01)

(52) U.S. Cl. .................. 345/531; 345/537; 345/530

(58) Field of Classification Search ........... 345/530, 345/531, 537, 538, 536, 556, 522, 501
See application file for complete search history.

(56) References Cited

U.S. PATENT DOCUMENTS

| | | | |
|---|---|---|---|
| 5,546,532 A * | 8/1996 | Trevett | 345/556 |
| 6,184,908 B1 * | 2/2001 | Chan et al. | 345/522 |
| 2002/0085013 A1 * | 7/2002 | Lippincott | 345/572 |
| 2003/0014609 A1 * | 1/2003 | Kissell | 711/206 |
| 2003/0058248 A1 * | 3/2003 | Hochmuth et al. | 345/537 |

* cited by examiner

*Primary Examiner*—Ulka Chauhan
*Assistant Examiner*—Joni Hsu
(74) *Attorney, Agent, or Firm*—Patterson & Sheridan, LLP (57) ABSTRACT

A system for processing graphics data. The system comprises a local memory for storing a first vertex array. The system further comprises a host memory for storing a second vertex array. A page table is configured to store page table entries related to the second vertex array, the page table entries including information indicating pages that have changed from the first vertex array to a second vertex array. A write watch module is coupled to the page table. The write watch module is configured to cause the first vertex array to be updated with changed pages.

16 Claims, 7 Drawing Sheets

METHODS AND APPARATUS FOR WRITE WATCH FOR VERTEX LISTS

FIELD OF THE INVENTION

Embodiments according to the present invention relate to graphics processing and more particularly to the handling of vertex arrays.

BACKGROUND

Current graphics processing systems and methods typically perform a limited number of specific operations on graphics data elements. Such operations include linear interpolation, tessellation, texture mapping and depth testing.

In prior art graphics systems, vertex arrays are typically transmitted between a host computer and local memory in a graphics subsystem. A limitation of prior art systems is that every time a vertex array is received at the host computer, the entire array is copied to the local memory. This can decrease system performance as the bandwidth between the host computer and the graphics subsystem is limited.

Accordingly, it would be desirable to improve the efficiency of vertex array processing by utilizing the available bandwidth more efficiently.

SUMMARY

Various embodiments according to the present invention include systems and methods for processing graphics data. In one embodiment, a system comprises a local memory for storing a first vertex array. The system further comprises a host memory for storing a second vertex array. A page table is configured to store page table entries related to the second vertex array, the page table entries including information indicating pages that have changed between the first vertex array and the second vertex array. A write watch module is coupled to the page table. The write watch module is configured to cause the first vertex array to be updated with changed pages.

A method of processing graphics data comprises receiving a second vertex array, examining page table entries in a page table, the page table entries related to the second vertex array and including information indicating pages that have changed between a first vertex array and the second vertex array, and copying a flagged page from the second vertex array to the first vertex array.

A system for processing graphics data comprises a local memory for storing a first vertex array, a host memory for storing a second vertex array, and a write watch module coupled to the host memory for comparing the second vertex array to the first vertex array and flagging a difference between the second vertex array and the first vertex array.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
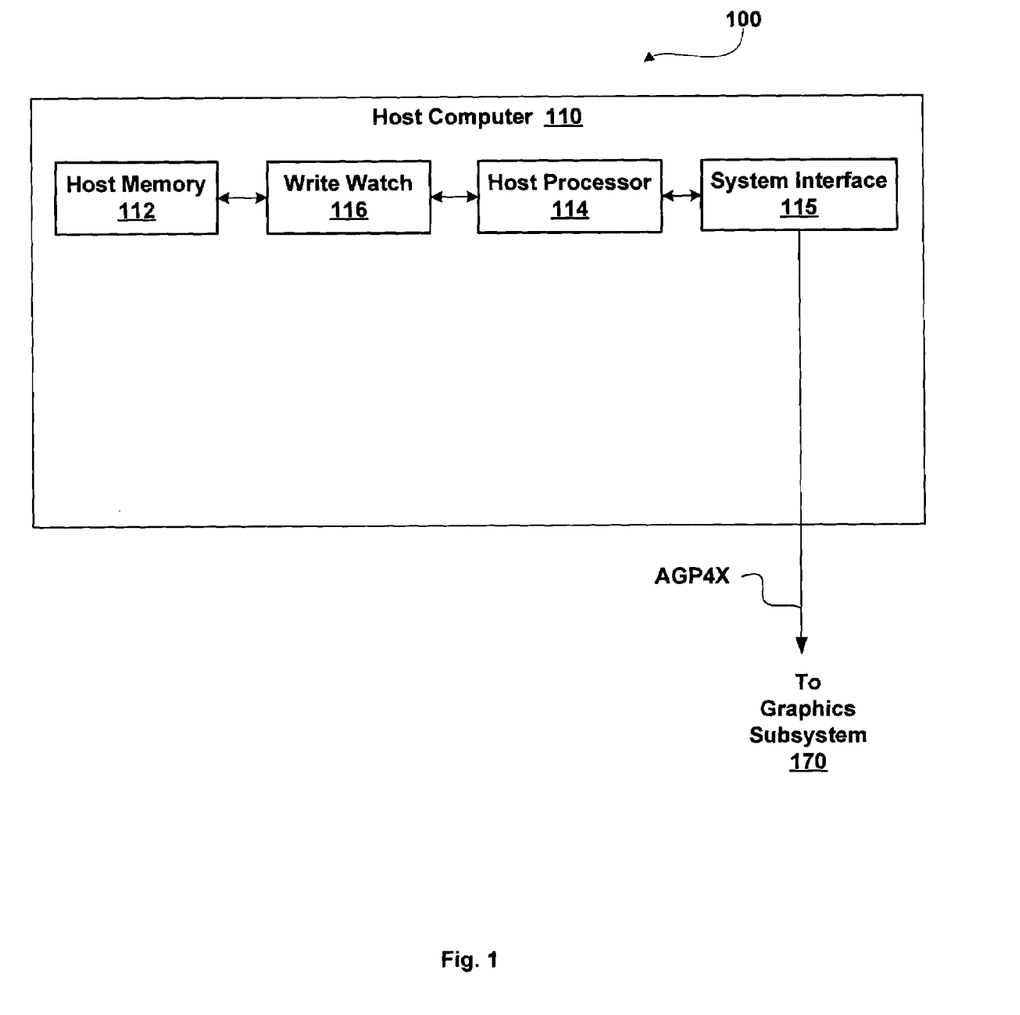
FIG. 1 is a block diagram of an exemplary embodiment of a first portion of a respective computer system in accordance with one or more aspects of the present invention.
Figure 2:
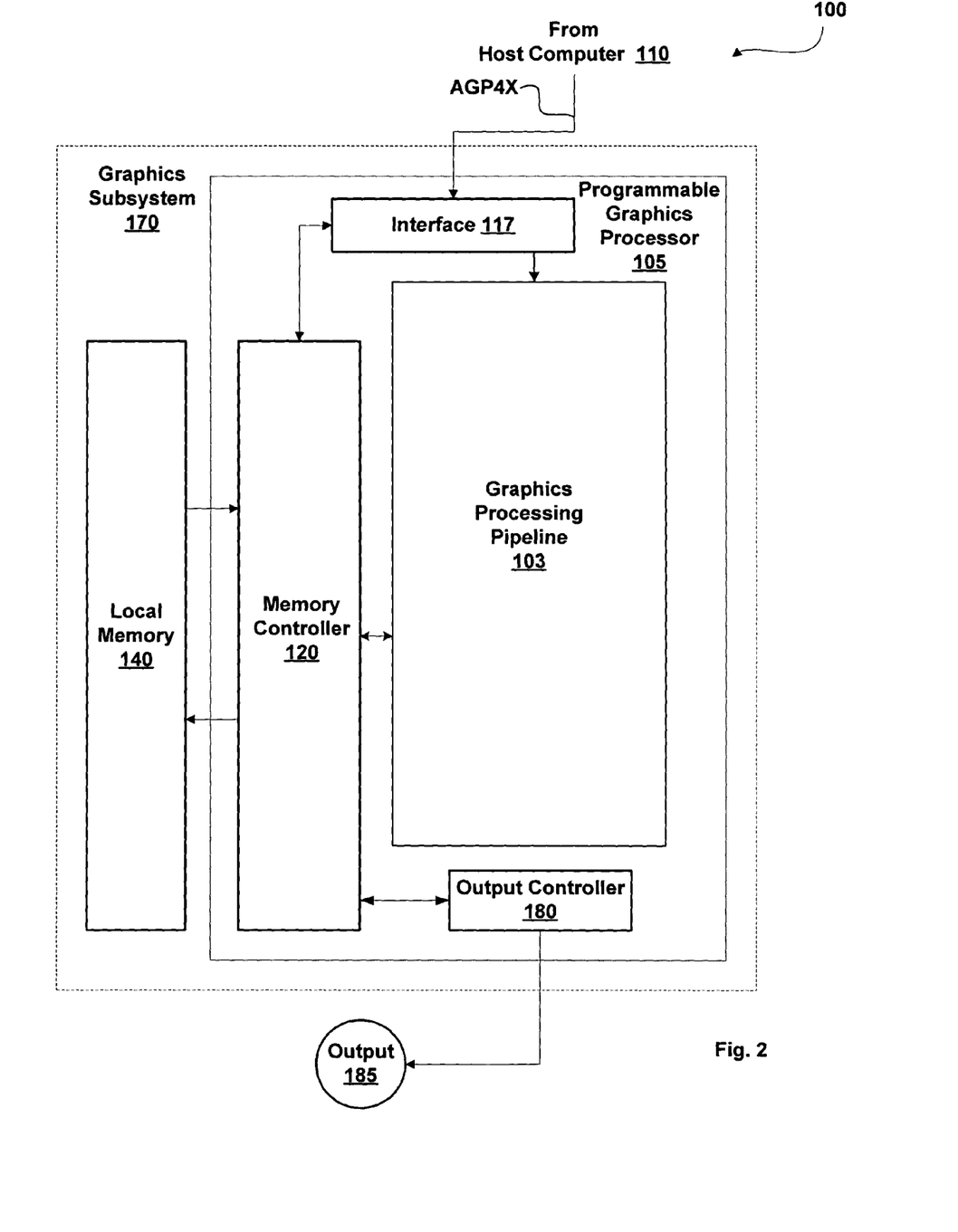
FIG. 2 is a block diagram of an exemplary embodiment of a second portion of a respective computer system in accordance with one or more aspects of the present invention.

FIGS. 1 and 2 are block diagrams of an exemplary embodiment of a first portion and a second portion, respectively, of a Computing System generally designated 100 and including a Host Computer 110 and a Graphics Subsystem 170. Computing System 100 may be a desktop computer, server, laptop computer, palm-sized computer, tablet computer, game console, cellular telephone, computer-based simulator or the like. Host computer 110 includes a Host Processor 114 that may include a system memory controller to interface to Host Memory 112 or may communicate with Host Memory 112 through a System Interface 115. System Interface 115 may be an input/output (I/O) interface or a bridge device including the system memory controller to interface directly to Host Memory 112. Examples of System Interface 115 known in the art include Intel® Northbridge and Intel® Southbridge. A Write Watch 116 can be coupled between Host Memory 112 and Host Processor 114. However, it is contemplated that Write Watch 116 can be located in any suitable location. Write Watch 116 improves bandwidth efficiency at an interface (e.g., AGP4X, AGP8X or any other suitable interface) as described herein. AGP stands for Accelerated Graphics Port. AGP is a PC bus architecture known in the art.

Host Computer 110 communicates with Graphics Subsystem 170 via System Interface 115 and an Interface 117 over wires such as, for example, AGP4X. As mentioned herein, the bandwidth of AGP4X (or other interface) is limited and is often a bottleneck in prior art systems. The performance of a system can be constrained by the bandwidth between Host Computer 110 and Graphics Subsystem 170. In a typical system there are many vertices per scene/frame and many textures to download to a Local Memory 140 and the like. As used herein, a vertex is a three-dimensional point in a graphics space.

Graphics Subsystem 170 includes Local Memory 140 and Programmable Graphics Processor 105. Data received at Interface 117, such as vertex arrays, can be passed to a Front End 130 within a Graphics Processing Pipeline 103 or written to Local Memory 140 through a Memory Controller 120. Programmable Graphics Processor 105 uses graphics memory to store graphics data and program instructions, where graphics data is any data that is input to or output from computation units within Programmable Graphics Processor 105. Graphics memory can include portions of Host Memory 112, Local Memory 140 directly coupled to Programmable Graphics Processor 105, register files coupled to the computation units within Programmable Graphics Processor 105, and the like.

Graphics Processing Pipeline 103 comprises programmable computation units to perform a variety of specialized functions. Some of the specialized functions the programmable computation units perform are table lookup, scalar addition, vector addition, multiplication, division, coordinate-system mapping, calculation of vector normals, tessellation, calculation of derivatives, interpolation and the like.

In a typical implementation Graphics Processing Pipeline 103 performs geometry computations, rasterization and pixel computations. Therefore Graphics Processing Pipeline 103 is programmed to operate on surface, primitive, vertex, fragment, pixel, sample or any other data.

Fragments output by Pixel Shader 160 are passed to Raster Analyzer 165, which performs near and far plane clipping and raster operations, such as stencil, z test and the like, and saves the results in Local Memory 140. When the data received by Graphics Subsystem 170 has been completely processed by Programmable Graphics Processor 105, an Output 185 of Graphics Subsystem 170 is provided using an Output Controller 180. Output Controller 180 is optionally configured to deliver data to a display device, network, electronic control system, other Computing System 100, other Graphics Subsystem 170 or the like.

Figure 3A:
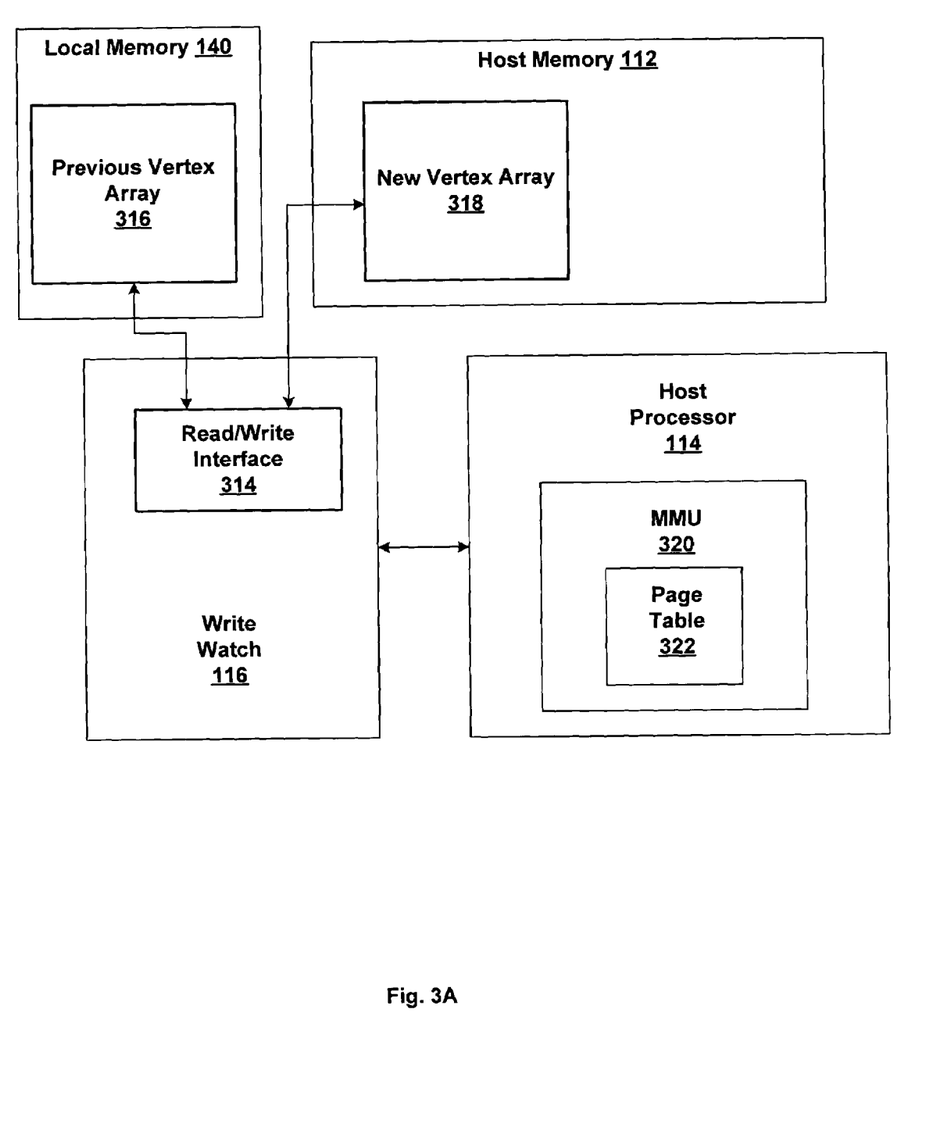
FIG. 3A is a block diagram showing a write watch module in accordance with one or more aspects of the present invention.

FIG. 3A is a block diagram showing Write Watch 116 in accordance with one or more aspects of the present invention. Write Watch 116 is coupled to Local Memory 140 and Host Memory 112. As mentioned herein, the path between Host Memory 112 and Local Memory 140 is often a bottleneck in prior art systems.

In one embodiment according to the present invention, Write Watch 116 includes Read/Write Interface 314. Read/Write Interface 314 is coupled to Previous Vertex Array 316 within Local Memory 140. Read/Write Interface 314 is also coupled to New Vertex Array 318 within Host Memory 112. Read/Write Interface 314 acts as an interface between Write Watch 116 and Host Memory 112. Similarly, Read/Write Interface 314 acts as an interface between Write Watch 116 and Local Memory 140 via System Interface 115. Write Watch 116 is coupled to Host Processor 114.

Host Processor 114 includes Memory Management Unit (MMU) 320. MMUs are known in the art and are typically hardware devices or circuits that support virtual memory and paging by translating virtual addresses into physical addresses. MMUs record whether a page has been modified since it was last paged into memory. A page is a memory block of fixed size (typically 4 kB or 8 kB in size).

MMU 320 includes Page Table 322. It is known in the art to map between virtual addresses and physical addresses by means of a page table data structure.

MMU 320 determines which pages, if any, differ between the pages of Previous Vertex Array 316 and the pages of New Vertex Array 318. Write Watch 116 updates dirty bits in Page Table 322 according to information from MMU 320. In an alternate embodiment MMU 320 updates dirty bits in Page Table 322. These dirty bits indicate if a page has changed from Previous Vertex Array 316 to New Vertex Array 318. In one embodiment, a copy of Previous Vertex Array 316 is stored in Host Memory 112 for more efficient access.

Figure 3B:
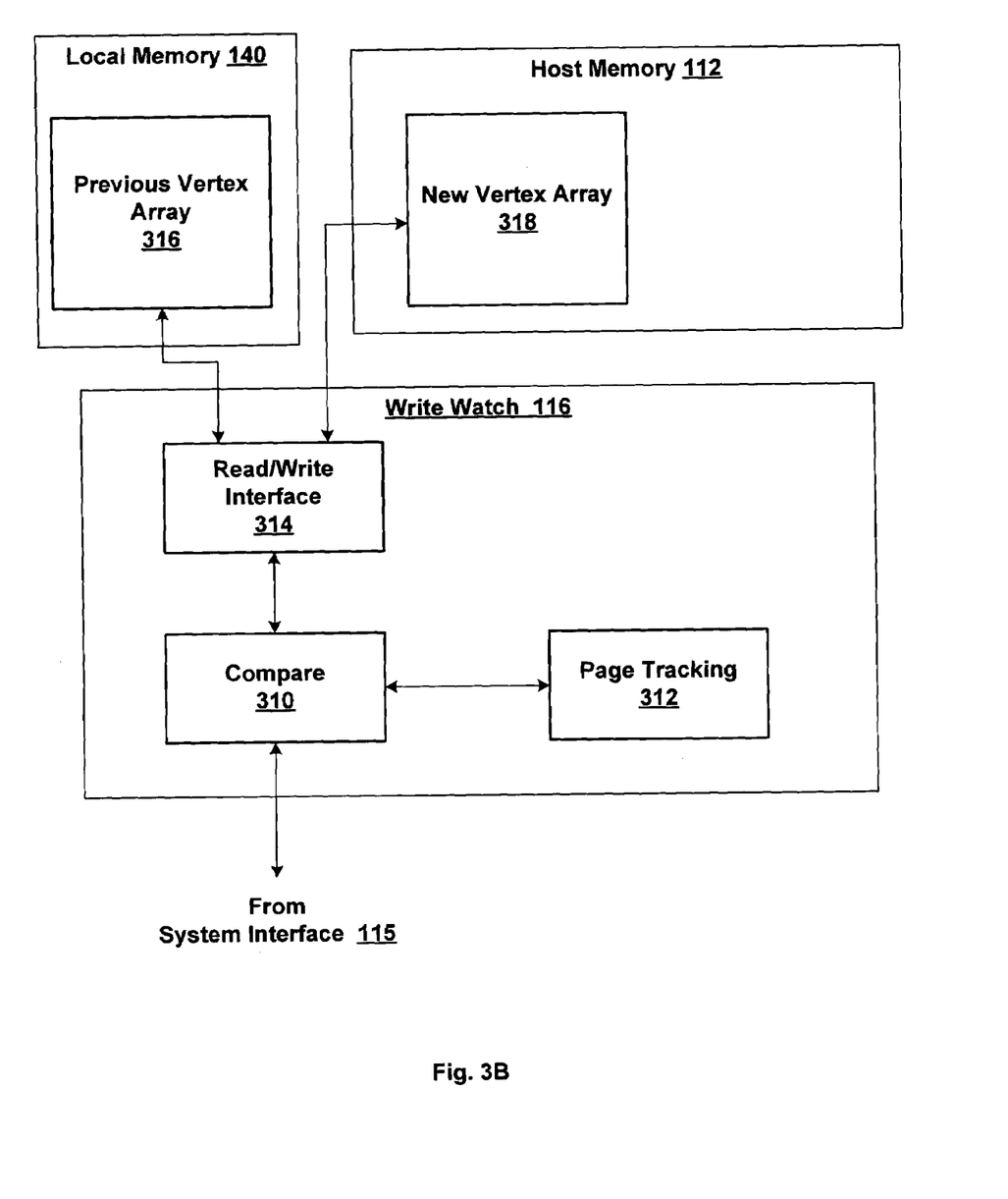
FIG. 3B is a block diagram showing an alternative write watch module in accordance with one or more aspects of the present invention.

FIG. 3B is a block diagram showing Write Watch 116 in accordance with one or more aspects of the present invention. Write Watch 116 is coupled to Local Memory 140 and Host Memory 112. As mentioned herein, the path between Host Memory 112 and Local Memory 140 is often a bottleneck in prior art systems.

In one embodiment according to the present invention, Write Watch 116 includes Compare 310 coupled to a Page Tracking 312 and a Read/Write Interface 314. Compare 310 compares New Vertex Array 318 to Previous Vertex Array 316. Read/Write Interface 314 is coupled to Previous Vertex Array 316 within Local Memory 140. Read/Write Interface 314 is also coupled to New Vertex Array 318 within Host Memory 112. Read/Write Interface 314 acts as an interface between Write Watch 116 and Host Memory 112. Similarly, Read/Write Interface 314 acts as an interface between Write Watch 116 and Local Memory 140 via System Interface 115.

Page Tracking 312 receives a signal from Compare 310 indicating which pages, if any, differ between the pages of Previous Vertex Array 316 and New Vertex Array 318. Page Tracking 312 updates dirty bits in a page table. These dirty bits indicate if a page has changed from Previous Vertex Array 316 to New Vertex Array 318. In one embodiment, a copy of Previous Vertex Array 316 is stored in Host Memory 112 for more efficient access. New Vertex Array 318 is compared to this copy.

Figure 4:
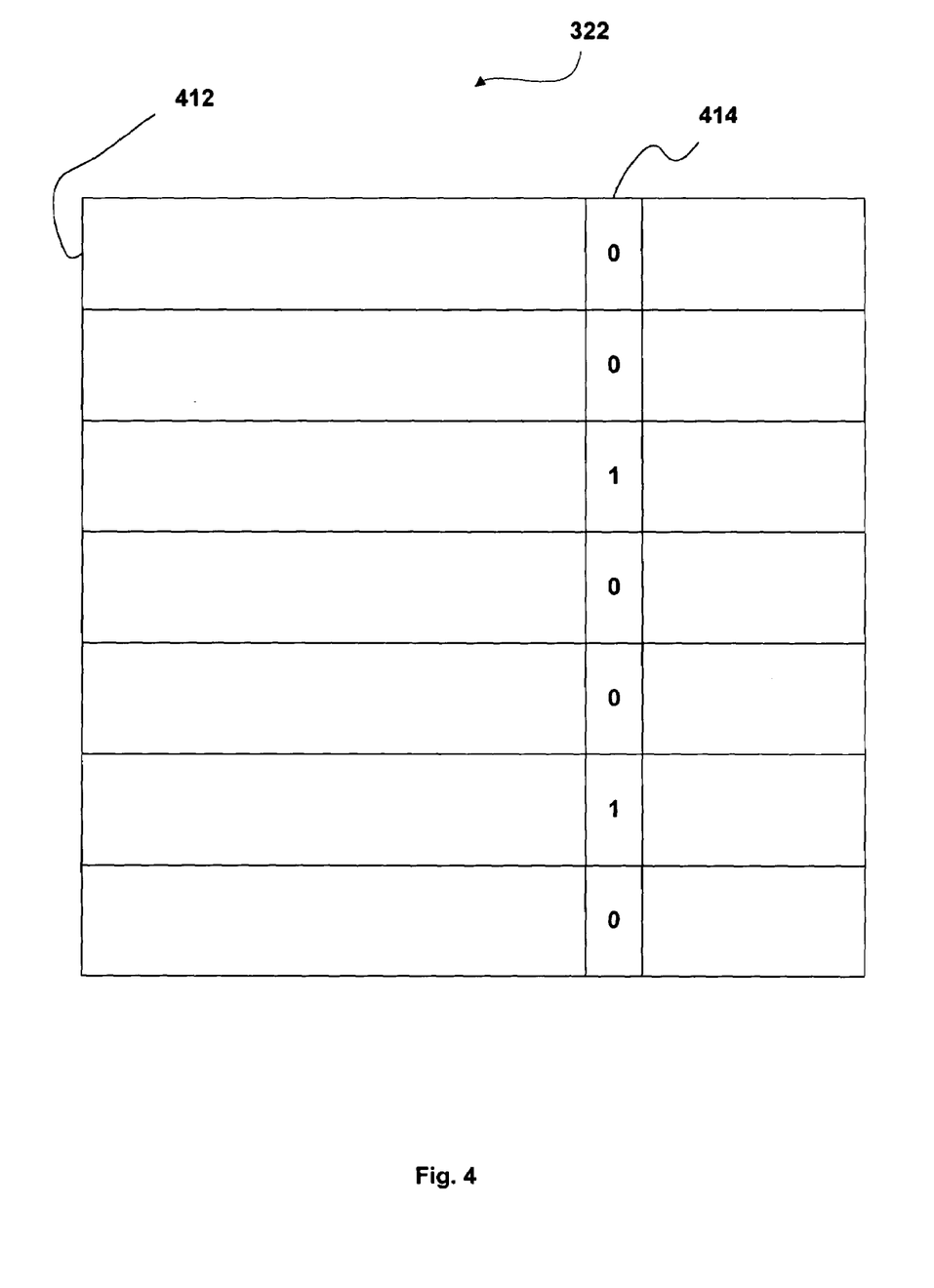
FIG. 4 is a block diagram of a page table in accordance with one or more aspects of the present invention.

Referring to FIG. 3A and FIG. 4, FIG. 4 is a block diagram of a Page Table 322 in accordance with one or more aspects of the present invention. As mentioned herein, Page Table 322 is stored within MMU 320 in one exemplary embodiment. However, it is envisioned that Page Table 322 can be stored in any suitable location.

Page Table 322 includes Page Table Entries 412 related to one or more pages of graphics data (e.g., vertex arrays or the like). For illustrative purposes, seven Page Table Entries 412 are depicted in FIG. 4. However, it is contemplated that more or fewer Page Table Entries 412 can reside within Page Table 322.

In one embodiment each Page Table Entry 412 includes a Dirty Bit 414. As mentioned herein, MMU 320 has information regarding which pages, if any, have recently changed. Write Watch 116 is coupled to MMU 320 and Page Table 322. Write Watch 116 writes, for Page Table Entries 412 corresponding to pages that have recently changed, a value of "1" to Dirty Bit 414 in one embodiment.

Thus, if only two pages have changed from Previous Vertex Array 316 to New Vertex Array 318 then it is not necessary to copy the entire New Vertex Array 318 over Previous Vertex Array 316. Only pages that have recently changed, i.e., have a corresponding Dirty Bit 414 equal to "1," are sent over AGP4X. This technique saves valuable bandwidth.

Referring to FIG. 3B and FIG. 4, as mentioned herein, Page Table 410 is stored within and created/modified by Page Tracking 312 in one exemplary embodiment. Page Table 410 includes data for one or more Pages 412. For illustrative purposes, Seven Pages 412 are depicted in FIG. 4. However, it is contemplated that more or fewer Pages 412 can exist within Page Table 410.

In one embodiment each Page 412 has a Dirty Bit 414. As mentioned herein, Compare 310 compares New Vertex Array 318 to Previous Vertex Array 316 and determines which pages, if any, have changed. The results from Compare 310 are output to Page Tracking 312. Page Tracking 312 changes, for Pages 412 that have changed, Dirty Bit 414 to "1."

Thus, if only two Pages 412 have changed from Previous Vertex Array 316 to New Vertex Array 318 then it is not necessary to copy the entire New Vertex Array 318 over Previous Vertex Array 316 or to perform a complete comparison between the two. Only Pages 414 that have recently changed, i.e., have Dirty Bit 414 equal to "1," are sent over AGP4X. This technique saves valuable bandwidth.

Figure 5A:
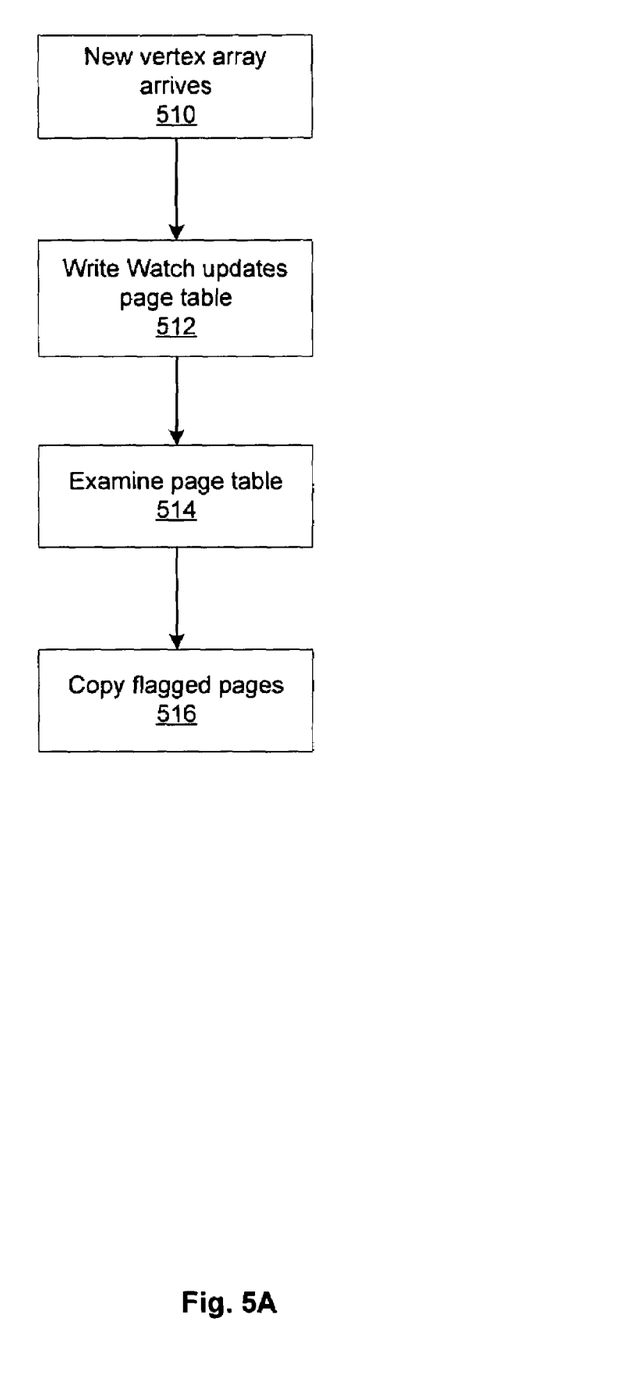
FIG. 5A is a flow diagram of the write watch module of FIG. 3A in use in accordance with one or more aspects of the present invention.

FIG. 5A is a flow diagram of Write Watch 116 in use in accordance with one or more aspects of the present invention depicted in FIG. 3A. In step 510 New Vertex Array 318 arrives in Host Memory 112 via System Interface 115 and Read/Write Interface 314.

In step 512 Write Watch 116 updates Page Table 322 so that Dirty Bits 414 in Page Table Entries 412 have a value of, in one embodiment, "1" for respective pages that have recently changed (i.e., changed from Previous Vertex Array 316 to New Vertex Array 318). Write Watch obtains information regarding which pages have changed from MMU 320. In an alternate embodiment MMU 320 updates Page Table 322.

In step 514 Write Watch 116 examines Page Table 322 to determine which Page Table Entries, if any, have values of "1."

In step 516 Write Watch 116 and Read/Write Interface 314 copy pages of New Vertex Array 318, if any, having a corresponding Page Table Entry 412 with Dirty Bit 414 equal to "1." The copying is performed from Host Memory 112 to Local Memory 140 via AGP4X. Then, New Vertex Array 318 becomes Previous Vertex Array 316 and the cycle repeats with the next New Vertex Array 318 arriving in, for example, Host Memory 112. Thus, on average, less data will travel across AGP4X than would be the case without Write Watch 116. Valuable bandwidth is preserved as a consequence.

Figure 5B:
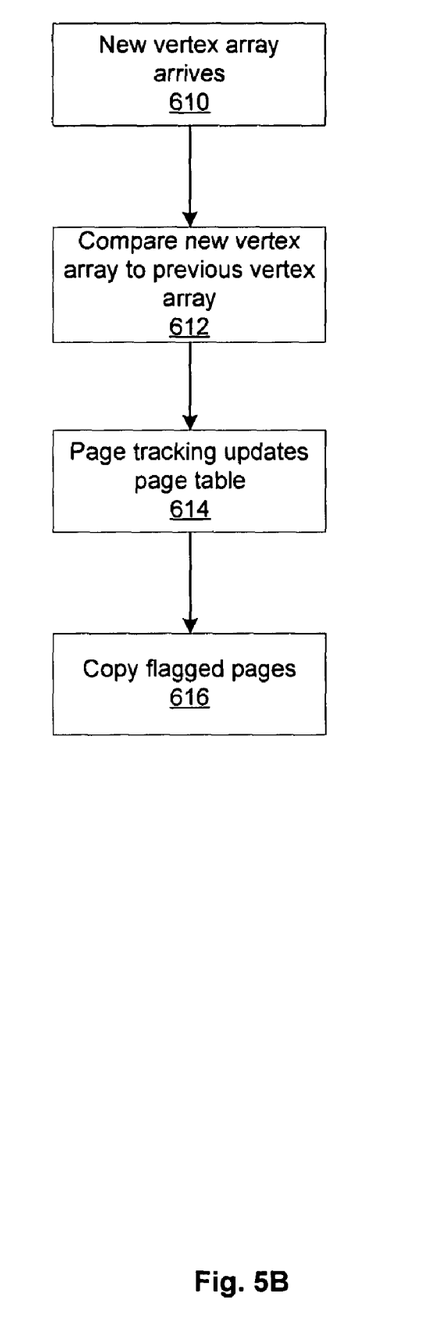
FIG. 5B is a flow diagram of the write watch module of FIG. 3B in use in accordance with one or more aspects of the present invention.

FIG. 5B is a flow diagram of the write watch module in use in accordance with one or more aspects of the present invention depicted in FIG. 3B. In step 610 New Vertex Array 318 arrives in Host Memory 112 via System Interface 115 and Read/Write Interface 314. In step 612 Compare 310 compares New Vertex Array 318 to Previous Vertex Array 316 and determines what Pages 412, if any, have recently changed. In one embodiment, a copy of Previous Vertex Array 316 has been stored in Host Memory 112 for more efficient access. New Vertex Array 318 is compared to Previous Vertex Array 316 that was stored in Host Memory 112.

In step 614 Page Tracking 312 updates Page Table 410, if necessary, so that Dirty Bit 414 is equal to "1" for the Page(s) 412 that have recently changed (i.e., changed from Previous Vertex Array 316 to New Vertex Array 318).

In step 616 Page(s) 412 of New Vertex Array 318 having a Dirty Bit 414 equal to "1" are copied from Host Memory 112 to Local Memory 140 via AGP4X. Then, New Vertex Array 318 becomes Previous Vertex Array 316 and the cycle repeats with the next New Vertex Array 318 arriving in Host Memory 112. Thus, on average, less data will travel across AGP4X than would be the case without Write Watch 116. Valuable bandwidth is preserved as a consequence.

While foregoing is directed to embodiments in accordance with one or more aspects of the present invention, other and further embodiments of the present invention may be devised without departing from the scope thereof, which is determined by the claims that follow. For example, it is noteworthy that although embodiments according to the present invention have been described within the context of a graphics processor, they are not limited to such.

Moreover, while embodiments according to the present invention have been described within the context of a vertex arrays, they are not limited to such. For example, embodiments according to the present invention may be applicable texture information, graphics state information or any other suitable data. Claims listing steps do not imply any order of the steps unless such order is expressly indicated.

All trademarks are the respective property of their owners.

The invention claimed is:

1. A system for processing graphics data, the system comprising:
   a host memory for storing a first vertex array;
   a local memory for storing a second vertex array that is a copy of the first vertex array;
   a host processor configured to change the first vertex array to produce a changed first vertex array that replaces the first vertex array stored in the host memory;
   a page table configured to store page table entries related to the second vertex array, the page table entries including information indicating pages that have changed from the changed first vertex array to the second vertex array; and
   a write watch module coupled to the page table and coupled to the host memory, the write watch module configured to cause the second vertex array to be updated with changed pages such that the second vertex array is equivalent to the changed first vertex array by copying only the changed pages from the host memory to the local memory and by initiating the copying of the changed pages when the host processor has completed changes to the first vertex array.

2. The system of claim 1, further comprising a memory management unit configured to facilitate the write watch module in updating the page table with information indicating pages that have changed from the first vertex array to the second vertex array.

3. The system of claim 2, wherein the page table is located within the memory management unit.

4. The system of claim 2, wherein the memory management unit is coupled to the write watch module.

5. The system of claim 1, wherein a page table entry comprises a dirty bit indicating whether there has been a change from the first vertex array to the second vertex array.

6. A method of processing graphics data, the method comprising:
   receiving a first vertex array produced by a host processor;
   copying the first vertex array from a host memory to a local memory to produce a copy of the first vertex array that is stored in the local memory;
   receiving a second vertex array produced by the host processor;
   examining page table entries in a page table, the page table entries including information indicating pages that have changed from the first vertex array to the second vertex array; and
   copying a flagged page of the second vertex array from the host memory to the local memory to update the copy of the first vertex array, wherein the copying of the flagged page of the second vertex array from the host memory to the local memory is initiated after the second vertex array is stored in the host memory.

7. The method of claim 6, further comprising updating the page table with the information indicating the pages that have changed from the first vertex array to the second vertex array.

8. The method of claim 7, wherein a memory management unit facilitates a write watch module in updating the page table.

9. The method of claim 6, wherein examining page table entries comprises examining dirty bits, the dirty bits indicating whether pages have changed from the first vertex array to the second vertex array.

10. The system of claim 1, wherein the write watch module is configured to compare the second vertex array to the changed first vertex array and flag a difference between the second vertex array and the changed first vertex array.

11. The system of claim 1, wherein the write watch module is configured to compare the second vertex array to the changed first vertex array by comparing the changed first vertex array to a copy of the first vertex array resident in the host memory.

12. The system of claim 1, wherein the write watch module is configured to flag a page table entry indicating a difference between the second vertex array and the changed first vertex array.

13. The system of claim 10, wherein the write watch module includes a compare module.

14. The system of claim 10, wherein the write watch module includes a page tracking module.

15. The method of claim 6, further comprising the step of comparing the first vertex array to the second vertex array to produce the information indicating the pages that have changed from the first vertex array to the second vertex array.

16. The method of claim 6, further comprising the step of comparing the copy of the first vertex array that is stored in the local memory to the second vertex array to produce the information indicating the pages that have changed from the first vertex array to the second vertex array.

* * * * *